Oct. 7, 1941.  W. E. DUNN  2,258,089
CONTROL SYSTEM FOR ENGINE COOLING WATER
Filed March 5, 1941
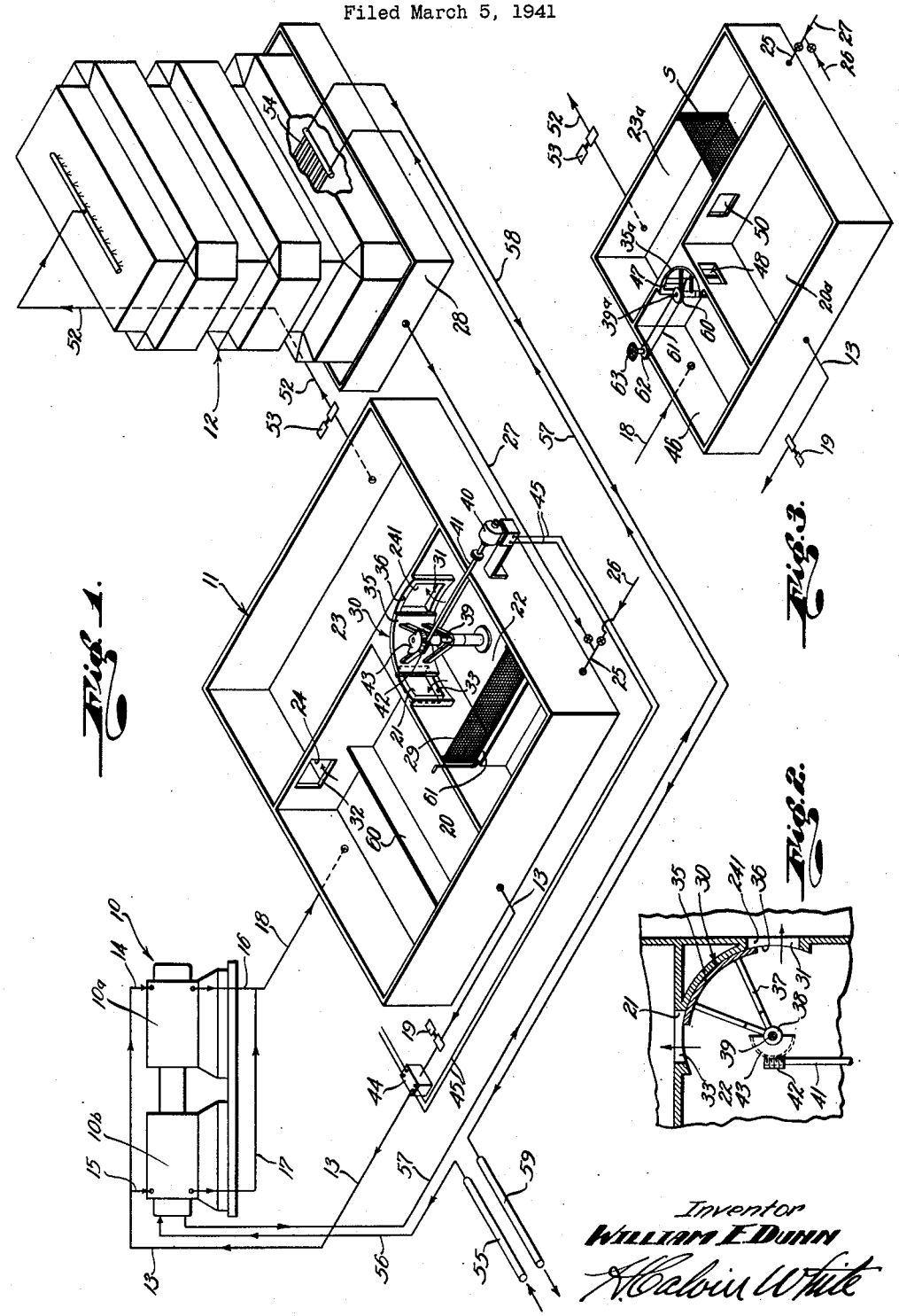
Inventor
WILLIAM E. DUNN
H. Calvin White
Attorney Patented Oct. 7, 1941

2,258,089

UNITED STATES PATENT OFFICE 2,258,089

CONTROL SYSTEM FOR ENGINE COOLING WATER

William E. Dunn, Kansas City, Mo., assignor to The Fluor Corporation, Ltd., Los Angeles, Calif., a corporation of California Application March 5, 1941, Serial No. 381,816

18 Claims. (Cl. 123—174)

This invention has to do with an improved system for controlling the temperature of engine cooling water, and adapted particularly for use in conjunction with heavy duty stationary engines of the type customarily employed in gas compressor plants, pumping plants and the like.

There are various known methods and systems for tempering or cooling the engine water, and operating generally to reduce the temperature of the hot water taken from the engine, and to return the cooled water to the engine at a controlled or predetermined constant temperature. According to one type of system, under which the invention may be classified, the hot engine water is tempered by admixing therewith relatively cool water in proportions determined by the proper water temperature required for most efficient operation of the engine. Such systems heretofore have required the use of valves or other parts producing restrictions in the water circulating system, and resultant mechanical complications, upkeep and power costs, and they also have necessitated a larger number of pumps and pump controls than are desirable (or necessary according to the present system). This invention has resulted from recognition of the desirability of dispensing with the customary devices requiring circulation or mixing of the water under pressure, the resulting power expenditure, and equipment beyond that necessary for simplest mixing and recirculation of the water.

My primary object is to provide a system for cooling the water for engines, compressors, and the like, whereby it is made possible to circulate and mix the waters under no appreciable resistance or head in excess of that required simply to force the water through the engine jacket cooling passages at the desired rate. In this manner I am able to maintain, with minimum power and equipment, water circulation through the engine at constant temperature, if desired, and at a maximum rate favoring heat transfer and the removal of scale or other accumulations in the water circulation passages.

In accordance with the invention, I have provided a system whereby the hot engine water and cool tempering water are admixed by gravity flow under accurate control, and under conditions requiring only a simple arrangement of intercommunicating reservoirs involving little expense and negligible supervision and upkeep. Where the cooling or tempering water is obtained from a cooling plant such as a water cooling tower, the reservoir assembly lends itself to simple connection and operation with the cooling tower, and again with minimum pumping equipment and operating upkeep or attention.

All the various features and objects of the invention, as well as the form and details of a typical and preferred embodiment, will be understood to better advantage from the description to follow and the accompanying drawing. In the drawing:

Fig. 1 is a perspective diagrammatic showing of a typical system embodying the invention;

Fig. 2 is a horizontal section through the tempering water control valve and associated weirs; and Fig. 3 is a plan view showing a variational form of intercommunicating reservoirs.

The system as illustrated in Fig. 1 is intended to represent at 10 a water cooled internal combustion engine, or battery or such engines, and in view of the particular adaptability of the invention to temperature control of cooling water for compressor plant engines, the unit 10 is shown to include a water cooled gas compressor, all as will later be explained more in detail. The temperature of the engine and compressor cooling water is controlled by regulated mixing of the hot jacket water with relatively cool tempering water, by an arrangement of intercommunicating reservoirs, generally indicated at 11, within which the hot and tempering waters are admixed by gravity flow under a simple valve control. While the invention broadly contemplates using cool or tempering water derived from any suitable source, the engine water cooling system most usually will be operated in conjunction with a water cooling unit such as a mechanical draft or atmospheric water cooling tower. As illustrative, therefore, the system may include a water cooling tower 12, shown conventionally as an atmospheric type, which serves to cool a stream of water continuously being circulated through the system of reservoirs 11, independently of the engine cooling water stream.

The unit indicated at 10 may comprise an engine 10a driving a gas compressor 10b, both having the usual cooling jackets or passages to which water is delivered from the reservoir 11 through lines 13, 14 and 15. The hot jacket water is returned from the engine and compressor to one of the reservoir compartments through lines 16, 17 and 18, no valves or pumps being required in any of these lines since the return flow to the reservoir may be by gravity or under the influence of the single circulating pump 19 in the supply line.

The assembly 11 need consist only of a simple arrangement of intercommunicating reservoirs having walls of concrete or other suitable material and openly exposed to the atmosphere. The engine and compressor cooling water is taken from and returned by the pipe 18 to a mixing reservoir 20 communicating through a weir opening 21 with a tempering water well 22, and with sump 23 through a weir opening 241. Well 22 and sump 23 are in direct communication through a third weir opening 241. The temperature of the engine cooling water withdrawn through line 13 from reservoir 20 is controlled, and preferably maintained at substantially constant value, by admixing with the hot water returned through line 18 to the reservoir 20, a regulated portion of the cool water flowing from well 22. As previously indicated, this cool water may be supplied to well 22 through line 25 from any suitable source, as by way of line 26, or the cool water may consist wholly or in part of water supplied to the well through line 27 from the basin 28 of the cooling tower 12, where the latter is used in the system. Any required make-up water in the cooling tower circuit, may be supplied through line 26, or directly to the cooling tower basin 28 or well 22.

After entering the well 22 the cold water passes thru screen 29 mounted on a frame to which is attached an adjustable weir 61. This adjustable weir may be required to control the level of the water in the cooling tower basin. The screen is for the purpose of removing dirt and solids from the water before entering the pump. The cooling water then flows thru the weir openings 21 and 241 into reservoir 20 and sump 23, the quantity or proportion of the water diverted to the reservoir being controlled by a suitable gate or valve mechanism generally indicated at 30, in accordance with the desired temperature of the engine cooling water in line 13.

In a typical installation the elevation of weirs 33 and 31 will be fixed and identical. Weirs 33 and 31 will be set at an elevation 6" or more above the elevation of weir 32. The proportion of the water diverted under control of valve 30 over weir 33 into reservoir 20, mixes with and cools or tempers the hot water fed to the reservoir thru line 18, to the proper temperature for most efficient engine operation, and the mixed water, at this temperature, are withdrawn by pump 19 thru line 13. A baffle or partition 60 may be placed in reservoir 20 as a means of better mixing the hot and cool waters and to assure that the excess hot water from the engine will pass through weir 32 before mixing with cold water from weir 33. Obviously the amount of warm water passing over weir 32 from reservoir 20 to sump 23 will exactly equal the amount of tempering water introduced into reservoir 20 thru weir 33. Since the circulation in both the jacket water system and cooling water system are each kept constant, it is also obvious that any desired circulation may be maintained in the jacket water system and the cooling water system independently, the only requirement between the two being that sufficient cooling water is circulated to supply the need thru well 22 for cool water to maintain the desired temperature in reservoir 20.

In a typical instance, the temperature of the water in well 22 may be between 70 and 80° F. and the hot water entering the reservoir from line 18 at a temperature of between 120 and 200° F. depending upon the type of engine being cooled. In an average instance the temperature of the cooling water taken thru line 13 to the engine will be from 105° to 150° depending upon the type of engine being cooled. Usually it is preferred to use a minimum quantity of the cool water for tempering the hot water in reservoir 20, and for this reason line 13 is connected into the reservoir toward the end through which the tempering water enters, and weir 32 is located toward the end of the reservoir at which the hot water enters.

As illustrated in Fig. 2, the valve 30 typically may comprise an arcuate valve segment 35 engaging or in close proximity to a correspondingly shaped wall segment 36, and supported by arms 37 integral with a hub 38 rotatable about a stationary vertical shaft 39. The valve may be automatically operated to maintain a predetermined constant water temperature in line 13, by any suitable type of control mechanism, of which many are known. For example, the valve may be operated by a reversible motor 40 through shaft 41 carrying worm 42 engaging gear segment 43 on the shaft 39, the motor in turn being operated under control of a thermostatic device 44 placed in line 13 and having electrical connections 45 with the motor.

For certain installations it may be desirable, and in fact more practicable, to use the control gate or valve in a modified reservoir assembly to regulate the proportion of hot engine jacket water admitted to the mixing reservoir, instead of so controlling the diversion of cold water into the reservoir, as previously described. For example as illustrated in Fig. 3, the jacket water is shown to be discharged through line 18 into a hot well 46 communicating through weir openings 47 and 48 with the cold water well or sump 23a and mixing reservoir 20a, respectively. The cold water entering well 23a from line 25 is in communication with the mixing reservoir through weir opening 50. In this instance, no weir is required in the cold water well. The screen S may be located either in the cooling tower basin or in the cold well 23a. The topography of the ground permitting, the hot well 46 and cooling tower basin are set at some distance below the elevation of the engine, and the top of the hot well and the top of the cooling tower basin are built to substantially the same elevation. The overflow edges of weir openings 47 and 48 may have a common elevation such that the water level in the well 46 is held slightly higher than the water level in the mixing reservoir 20a and well 23a. Valve 35a, having pulley and chain or belt connections 60, 61 and 62 with hand wheel 63, may be manually regulated by operation of the hand wheel to control the proportions of the hot water flowing through openings 47 and 48 to the sump and mixing reservoir. A portion of the cooled tempering water, depending upon the amount of hot water admitted to the mixing reservoir, enters the latter through opening 50, and the remainder of the cold water is returned through line 52 to the cooling tower.

Water is taken from sump 23 (or 23a) for cooling, through line 52 and elevated by pump 53 to the top of the cooling tower 12, the water being cooled in passing down through the tower and the cooled water collecting in the tower basin 28. Ordinarily the reservoir assembly 11 and tower basin will be on about the same level, and if desired in the system of Fig. 1, well 22 may be formed as a portion or extension of the tower basin 28. It will be understood that the tower 12 may be utilized for cooling purposes in addition to the cooling of tempering water as described in the foregoing. As a typical example of additional cooling load that may be carried by the tower, I have shown within the tower a usual cooling coil 54 which may serve to cool the gas compressed by the engine driven compressor 10b. Gas taken from the main 55 to the compressor through line 56 is discharged through line 57 to the coil 54 and the cooled gas taken through line 58 to the discharge main 59.

It will be observed that the system requires an absolute minimum of pumps, only one pump being needed for circulation of the water through the engine-compressor unit and the reservoir 20 and 20a, and only a single additional pump 53 required for circulation of water over the tower and back through the cold water well to the sump. No additional power is necessary for mixing the hot and cold waters inasmuch as the flow of water within the reservoir assembly 11 occurs solely by gravity. It is also to be noted that proper temperature control may be affected without throttling the pump or in any way restricting the size of the water pasages, thus permitting, if desired, relatively high speed pump operation and high velocity water circulation.

Assuming of course that the cooling tower 12 is designed to accommodate the cooling load incident to the engine water cooling system, and also all other cooling loads imposed on the tower, the system maintains certain desired independences between the engine water circulating system and cooling conditions in the tower. Thus the cooling tower basin water may be unaffected by the engine jacket water temperature, and the cooling of gas or other cooling work by the tower water unaffected by the circulation rate and temperature of the water in the engine cooling system. The temperature of the water flowing to the engine may be independent of the rate of the water circulation. And further, the rate at which the water is discharged from the sump to the cooling tower may be entirely independent of water circulation in the engine cooling system.

While the drawing illustrates a desirable and preferred embodiment of the invention, it will be understood that various changes and modifications may be made within the scope of the invention as defined by the appended claims.

I claim:

1. The method of supplying an engine with controlled temperature cooling water, that includes discharging hot water from the engine into a reservoir, maintaining an upper body of relatively cool water and a constant gravity flow of water from said body into a lower body of water, maintaining a constant gravity flow of water from the reservoir into said lower body of water, diverting into said reservoir a portion of the water flowing from said upper body, mechanically discharging a stream of the mixed waters from the reservoir to the engine, discharging water from said lower body through a cooling zone and returning the cooled water to said upper body of water, and controlling the rate of said diverted water flow into the reservoir in accordance with the temperature of said mixed water stream.

2. The method of supplying an engine with controlled temperature cooling water, that includes discharging hot water from the engine into a reservoir, maintaining an upper body of relatively cool water and a constant gravity flow of water from said body into a lower body of water, maintaining a constant gravity flow of water from the reservoir into said lower body of water, diverting into said reservoir a portion of the water flowing from said upper body, mechanically discharging a stream of the mixed waters from the reservoir to the engine at a constant rate, controlling the rate of said diverted water flow into the reservoir to maintain said mixed water stream at substantially constant temperature, discharging water from said lower body through a cooling zone, and then returning the cooled water to said upper body of water.

3. A system for supplying an engine with controlled temperature cooling water, comprising a reservoir receiving hot water from the engine, a well containing relatively cool tempering water, a sump into which water flows by gravity from said well, means for maintaining a gravity flow of water from said reservoir into the sump, means diverting a gravity flow of water from said well into the reservoir, a pump for discharging the mixed water from the reservoir to the engine, and a valve for controlling the rate of tempering water flow from said well to the reservoir in accordance with a predetermined temperature of said mixed water stream.

4. A system for supplying an engine with controlled temperature cooling water, comprising a reservoir receiving hot water from the engine, a well containing relatively cool tempering water, a sump into which water flows by gravity from said well, means maintaining a gravity flow of water from said reservoir into the sump, means diverting a gravity of flow of water from said well into the reservoir, a pump for discharging the mixed waters from the reservoir to the engine, a valve for controlling the rate of tempering water flow from said well to the reservoir in accordance with a predetermined temperature of said mixed water stream, means providing a cooling zone, and means for passing water from said sump through the cooling zone and for returning the cooled water to said well.

5. A system for supplying an engine with controlled temperature cooling water, comprising a reservoir receiving hot water from the engine, a well containing relatively cool tempering water, a sump into which water flows by gravity from said well, means maintaining a gravity flow of water from said reservoir into the sump, means diverting a gravity flow of water from said well into the reservoir, a pump for discharging the mixed waters from the reservoir to the engine, a valve for controlling the rate of tempering water flow from said well to the reservoir in accordance with a predetermined temperature of said mixed water stream, a water cooling tower, and means for passing water from said sump through the cooling tower and for returning the cooled water to said well.

6. The method of applying an engine or the like with controlled temperature cooling water, that includes maintaining a stream of cool tempering water, discharging a stream of hot engine water from the engine into an enlarged reservoir, mixing the engine water and cooling water at atmospheric pressure by their gravity flow into said reservoir, controlling the proportion of said hot and tempering waters mixed in the reservoir in accordance with a desired temperature for the mixed waters, mechanically discharging a stream of the mixed waters from the reservoir to the engine, said mixed waters including a portion only of the water discharged from the engine, and separately withdrawing the remaining portion of said water discharged from the engine.

7. The method of supplying an engine or the like with controlled temperature cooling water, that includes maintaining a stream of cool tempering water, discharging a stream of hot engine water from the engine into an enlarged reservoir, mixing the engine water and a portion only of the cooling water at atmospheric pressure by their gravity flow into said reservoir, controlling the proportions of said hot and tempering waters mixed in the reservoir in accordance with a desired temperature for the mixed waters, mechanically discharging a stream of the mixed waters from the reservoir to the engine, said mixed waters including a portion only of the water discharged from the engine, and separately withdrawing the remaining portion of said water discharged from the engine together with tempering water not mixed with the engine water in said reservoir.

8. The method of supplying an engine or the like with controlled temperature cooling water, that includes maintaining a stream of cool tempering water, discharging a stream of hot engine water from the engine into an enlarged reservoir, mixing a portion only of the engine water with the cooling water by their gravity flow into said reservoir, separately withdrawing the remaining portion of the engine water, controlling the proportions of said hot and tempering waters mixed in the reservoir in accordance with a desired temperature for the mixed waters, and mechanically discharging a stream of the mixed waters from the reservoir to the engine.

9. The method of supplying an engine or the like with controlled temperature cooling water, that includes maintaining a stream of cool tempering water, discharging a stream of hot engine water from the engine into an enlarged reservoir, mixing a portion only of the engine water with a portion only of the cooling water by their gravity flow into said reservoir, separately withdrawing the remaining portions of the engine water and cooling water, controlling the proportions of said hot and tempering waters mixed in the reservoir in accordance with a desired temperature for the mixed waters, and mechanically discharging a stream of the mixed waters from the reservoir to the engine.

10. The method of supplying an engine or the like with controlled temperature cooling water, that includes discharging a stream of the hot engine water into a reservoir, maintaining a supply of cool tempering water to an enlarged body of water substantially cooler than said engine water, diverting a gravity flow of water from said body into the reservoir and thereby mixing the hot and cool waters at atmospheric pressure within the reservoir, controlling the proportions of the waters so mixed in accordance with a desired temperature for the mixed waters, mechanically discharging a stream of the mixed waters from the reservoir to the engine, said mixed waters including a portion only of the water discharged from the engine, and separately withdrawing the remaining portion of said water discharged from the engine.

11. The method of supplying an engine or the like with controlled temperature cooling water, that includes discharging a stream of the hot engine water into a reservoir, maintaining a supply of cool tempering water to an enlarged body of water substantially cooler than said engine water, diverting a gravity flow of a portion of the water in said body into the reservoir and thereby mixing the hot and cool waters at atmospheric pressure within the reservoir, controlling the proportions of the waters so mixed in accordance with a desired temperature for the mixed waters, mechanically discharging a stream of the mixed waters from the reservoir to the engine, said mixed waters including a portion only of the water discharged from the engine, and separately withdrawing the remaining portion of said water discharged from the engine together with the water not diverted from said body into the reservoir.

12. The method of supplying an engine or the like with controlled temperature cooling water, that includes maintaining a stream of cool tempering water, discharging a stream of hot engine water from the engine into an enlarged reservoir, mixing the engine water and cooling water at atmospheric pressure by their gravity flow into said reservoir, controlling the proportions of said hot and tempering waters mixed in the reservoir in accordance with a desired temperature for the mixed waters, mechanically discharging a stream of the mixed waters from the reservoir to the engine, said mixed waters including a portion only of the water discharged from the engine, separately withdrawing the remaining portion of said water discharged from the engine, and passing the removed water through a cooling zone and returning it to said stream of cool tempering water.

13. The method of supplying an engine or the like with controlled temperature cooling water, that includes maintaining a stream of cool tempering water, discharging a stream of hot engine water from the engine into an enlarged reservoir, mixing the engine water and a portion only of the cooling water at atmospheric pressure by their gravity flow into said reservoir, controlling the proportions of said hot and tempering waters mixed in the reservoir in accordance with a desired temperature for the mixed waters, mechanically discharging a stream of the mixed waters from the reservoir to the engine, said mixed waters including a portion only of the water discharged from the engine, separately withdrawing the remaining portion of said water discharged from the engine together with tempering water not mixed with the engine water in said reservoir, and passing the removed waters through a cooling zone and returning them to said stream of cool tempering water.

14. The method of supplying an engine or the like with controlled temperature cooling water, that includes discharging a stream of the hot engine water into a reservoir, maintaining a supply of cool tempering water to an enlarged body of water substantially cooler than said engine water, diverting a gravity flow of a portion of the water in said body into the reservoir and thereby mixing the hot and cool waters at atmospheric pressure within the reservoir, controlling the proportions of the waters so mixed in accordance with a desired temperature for the mixed waters, mechanically discharging a stream of the mixed waters from the reservoir to the engine, said mixed waters including a portion only of the water discharged from the engine, separately withdrawing the remaining portion of said water discharged from the engine together with the water not diverted from said body into the reservoir, and passing the removed waters through a cooling zone and returning them to said enlarged body of water.

15. A system for supplying an engine with controlled temperature cooling water, comprising a reservoir receiving a stream of hot water flowing by gravity from the engine, a well containing a body of water cooler than the engine water, means for maintaining a supply of cool tempering water to said well, means for diverting a gravity flowing stream of the cool water from said well into the reservoir so that the hot and cool waters are mixed at atmospheric pressure, means for controlling the rate of flow of one of said streams into the reservoir to maintain the mixed water at predetermined temperature, a pump for discharging the mixed water from the reservoir to the engine, the mixed water being pumped to the engine including a portion only of the water discharged from the engine, and means for separately withdrawing the remaining portion of said water discharged from the engine.

16. A system for supplying an engine with controlled temperature cooling water, comprising a reservoir receiving a stream of hot water flowing by gravity from the engine, a well containing a body of water cooler than the engine water, means for maintaining a supply of cool tempering water to said well, means for diverting a gravity flowing stream of the cool water from said well into the reservoir so that the hot and cool waters are mixed at atmospheric pressure, said diverted stream comprising a portion only of the water flowing through said well, means for controlling the rate of flow of one of said streams into the reservoir to maintain the mixed water at predetermined temperature, a pump for discharging the mixed water from the reservoir to the engine, the mixed water being pumped to the engine including a portion only of the water discharged from the engine, and means for separately withdrawing the remaining portion of said water discharged from the engine together with the remaining portion of the cool water not diverted from said well into the reservoir.

17. A system for supplying an engine with controlled temperature cooling water, comprising a reservoir receiving a stream of hot water flowing by gravity from the engine, a well containing a body of water cooler than the engine water, means for maintaining a supply of cool tempering water to said well, means for diverting a gravity flowing stream of the cool water from said well into the reservoir so that the hot and cool waters are mixed at atmospheric pressure, means for controlling the rate of flow of one of said streams into the reservoir to maintain the mixed water at predetermined temperature, a pump for discharging the mixed water from the reservoir to the engine, the mixed water being pumped to the engine including a portion only of the water discharged from the engine, means for separately withdrawing the remaining portion of said water discharged from the engine, and means for cooling the withdrawn water and returning it to said well.

18. A system for supplying an engine with controlled temperature cooling water, comprising a reservoir receiving a stream of hot water flowing by gravity from the engine, a well containing a body of water cooler than the engine water, means for maintaining a supply of cool tempering water to said well, means for diverting a gravity flowing stream of the cool water from said well into the reservoir so that the hot and cool waters are mixed at atmospheric pressure, said diverted stream comprising a portion only of the water flowing through said well, means for controlling the rate of flow of one of said streams into the reservoir to maintain the mixed water at predetermined temperature, a pump for discharging the mixed water from the reservoir to the engine, the mixed water being pumped to the engine including a portion only of the water discharged from the engine, means for separately withdrawing the remaining portion of said water discharged from the engine together with the remaining portion of the cool water not diverted from said well into the reservoir, and means for cooling the withdrawn waters in open exposure to the atmosphere and returning the cooled waters to said well.

WILLIAM E. DUNN.